US009628896B2

(12) United States Patent
Ichimura

(10) Patent No.: US 9,628,896 B2
(45) Date of Patent: Apr. 18, 2017

(54) REPRODUCING DEVICE, HEADPHONE AND REPRODUCING METHOD

(75) Inventor: Kiminobu Ichimura, Tokyo (JP)

(73) Assignee: SONY CORPORATION, Tokyo (JP)

(*) Notice: Subject to any disclaimer, the term of this patent is extended or adjusted under 35 U.S.C. 154(b) by 610 days.

(21) Appl. No.: 12/887,967

(22) Filed: Sep. 22, 2010

(65) Prior Publication Data
US 2011/0096939 A1 Apr. 28, 2011

(30) Foreign Application Priority Data
Oct. 28, 2009 (JP) ................. 2009-247927

(51) Int. Cl.
H04R 1/10 (2006.01)
H04S 7/00 (2006.01)
H04R 5/033 (2006.01)

(52) U.S. Cl.
CPC .......... H04R 1/1083 (2013.01); H04S 7/304 (2013.01); *H04R 1/1041* (2013.01); *H04R 5/033* (2013.01); *H04R 2420/07* (2013.01); *H04R 2430/20* (2013.01); *H04R 2460/13* (2013.01); *H04S 2400/11* (2013.01); *H04S 2400/13* (2013.01); *H04S 2420/07* (2013.01)

(58) Field of Classification Search
CPC .... H04R 1/1083; H04R 1/1041; H04R 5/033; H04R 2430/20; H04R 2460/13; H04S 2420/07; H04S 7/304; H04S 2400/11; H04S 2400/13
USPC ..... 381/74, 309, 310, 110, 17, 18, 306, 307, 381/61, 77, 80, 81; 455/575.2
See application file for complete search history.

(56) References Cited

U.S. PATENT DOCUMENTS

| 5,734,724 | A | * | 3/1998 | Kinoshita et al. | 381/17 |
| 5,884,257 | A | * | 3/1999 | Maekawa et al. | 704/248 |
| 5,959,597 | A | * | 9/1999 | Yamada et al. | 345/8 |
| 5,974,152 | A | * | 10/1999 | Fujinami | 381/1 |
| 6,021,205 | A | * | 2/2000 | Yamada et al. | 381/310 |
| 6,289,231 | B1 | * | 9/2001 | Watanabe et al. | 600/407 |
| 6,463,157 | B1 | * | 10/2002 | May | 381/151 |
| 6,591,198 | B1 | * | 7/2003 | Pratt | 702/35 |
| 6,614,912 | B1 | * | 9/2003 | Yamada et al. | 381/310 |
| 6,658,121 | B1 | * | 12/2003 | Konig | 381/309 |
| 7,369,667 | B2 | * | 5/2008 | Yamada | 381/309 |
| 7,433,479 | B2 | * | 10/2008 | Sato | 381/309 |

(Continued)

FOREIGN PATENT DOCUMENTS

| JP | 05219597 A | * | 8/1993 | ............ H04S 1/00 |
| JP | 06090500 A | * | 3/1994 | ............ H04S 5/02 |

(Continued)

*Primary Examiner* — Vivian Chin
*Assistant Examiner* — Con P Tran
(74) *Attorney, Agent, or Firm* — Chip Law Group

(57) ABSTRACT

A reproducing device includes a reproducing unit configured to reproduce a contents sound, an output unit configured to output the contents sound which has been reproduced using the reproducing unit to a headphone, a talk detection unit configured to detect that a headphone fitter who fits the headphone talks with a person and an image normal position control unit configured to move the normal position of the image of the contents sound which has been reproduced using the reproducing unit to an arbitrary position when the talk detecting unit has detected that the headphone fitter has started talking with the person.

15 Claims, 7 Drawing Sheets

LISTENING MODE

HEADPHONE FITTER

TALKING MODE

PERSON

(56) References Cited

U.S. PATENT DOCUMENTS

| | | |
|---|---|---|
| 7,456,875 B2* | 11/2008 | Kashiwa .................. 348/239 |
| 7,674,967 B2* | 3/2010 | Makino ..................... 84/612 |
| 2001/0046304 A1* | 11/2001 | Rast ........................ 381/74 |
| 2002/0034307 A1* | 3/2002 | Kubota ..................... 381/17 |
| 2003/0076973 A1* | 4/2003 | Yamada .................. 381/309 |
| 2003/0118192 A1* | 6/2003 | Sasaki ..................... 381/17 |
| 2004/0013278 A1* | 1/2004 | Yamada .................. 381/309 |
| 2004/0120530 A1* | 6/2004 | Sapashe et al. .......... 381/58 |
| 2004/0120533 A1* | 6/2004 | Dedieu et al. ............ 381/92 |
| 2004/0136543 A1* | 7/2004 | White et al. ............. 381/74 |
| 2004/0242278 A1* | 12/2004 | Tomoda et al. .......... 455/563 |
| 2005/0117761 A1* | 6/2005 | Sato ...................... 381/309 |
| 2005/0126370 A1* | 6/2005 | Takai et al. .............. 84/636 |
| 2006/0220882 A1* | 10/2006 | Makino ................. 340/573.1 |
| 2006/0274731 A1* | 12/2006 | Ito ......................... 370/352 |
| 2007/0092087 A1* | 4/2007 | Bothra et al. ............ 381/74 |
| 2007/0127879 A1* | 6/2007 | Frank et al. ............. 386/46 |
| 2007/0189544 A1* | 8/2007 | Rosenberg ............... 381/57 |
| 2008/0001780 A1* | 1/2008 | Ohno et al. .............. 340/904 |
| 2008/0175402 A1* | 7/2008 | Abe et al. ................ 381/71.6 |
| 2008/0187148 A1* | 8/2008 | Itabashi et al. .......... 381/71.6 |
| 2008/0201138 A1* | 8/2008 | Visser et al. ............. 704/227 |
| 2008/0240461 A1* | 10/2008 | Nakamura et al. ....... 381/81 |
| 2009/0043411 A1* | 2/2009 | Yamada et al. .......... 700/94 |
| 2009/0082071 A1* | 3/2009 | Hicks, III ................ 455/570 |
| 2009/0232325 A1* | 9/2009 | Lundquist ................ 381/74 |
| 2009/0249942 A1* | 10/2009 | Suzuki et al. ............ 84/602 |
| 2010/0215198 A1* | 8/2010 | Ngia et al. ............... 381/309 |

FOREIGN PATENT DOCUMENTS

| | | |
|---|---|---|
| JP | 2008-193420 | 8/2008 |
| JP | 2009-44263 | 2/2009 |

* cited by examiner

REPRODUCING DEVICE, HEADPHONE AND REPRODUCING METHOD

BACKGROUND OF THE INVENTION

1. Field of the Invention

The present invention relates to a reproducing device, a headphone and a reproducing method which may be favorably applicable, for example, in the case that one person (assumed to be a male) talks with another person with a headphone fitted on his head.

2. Description of the Related Art

Nowadays, a reproducing device and a headphone of the types having a so-called noise cancelling function for picking up external sounds using a microphone attached to the headphone and outputting a sound which is out of phase with the external sounds to reduce sounds (noise) from the outside are commercially available. Incidentally, in the following description, the noise cancelling function will be referred to as the NC function and the microphone will be referred to as the mike.

Use of a reproducing device and a headphone of the above mentioned types may make it possible for a user to listen to the music or the like of clear tone quality in which external noise has been reduced.

Incidentally, in the case that a person calls out to a user and the user intends to talk with the person while the user is listening to the music with a headphone as mentioned above fitted on his head, the voice of the person may be also regarded as the noise from the outside and reduced because the NC function works, the voice of the person may be hardly caught and hence it may become difficult to talk with the person.

Therefore, in the above mentioned situation, for example, the user may remove the headphone from his head to talk with the person. In addition, a headphone which is provided with a mute button used to temporarily stop working of the NC function and output of a reproduced sound so as to listen to external sounds may be also available. When a headphone as mentioned above is used, a user may be permitted to talk with a person with the headphone fitted on his head by depressing the mute button.

However, it may be troublesome for the user to remove the headphone from his head and to depress the mute button each time. In particular, in the case that the user's hands are full of baggage, the user may take the trouble to put the baggage on the ground and then to remove the headphone from his head or to depress the mute button.

Thus, in a reproducing device and a headphone as mentioned above, in order to improve their handiness in talking with a person, it is desirable for the user to talk with a person with the headphone fitted on his head and with no operation of any button.

Therefore, a headphone configured to permit a user to talk with a person who is present in the front of the user with the headphone fitted on his head and with no operation of any button by outputting a sound generated from the front without turning the volume thereof low is proposed, for example, as disclosed in Japanese Laid-open Patent Publication No. 2008-193420.

SUMMARY OF THE INVENTION

However, in the case that a user talks with a person who is present in the front of the user in a state in which a reproduced sound is being output from the above mentioned headphone, it may sometimes occur that the image of the voice of the person who is present in the front of the user overlaps the image of the reproduced sound and the voice of the person is hardly caught.

In the above mentioned situation, eventually, it may become unavoidable for the user to remove the headphone from his head or depress a reproduction stop button used to stop output of a reproduced sound and hence the handiness of the headphone in talking with the person may be reduced.

The present invention has been made in view of the above mentioned points and aims to propose a reproducing device, a headphone and a reproducing method which are more increased in handiness in talking with a person than ever.

In order to solve the above mentioned problems, according to one embodiment of the present invention, there is provided a reproducing device including a reproducing unit configured to reproduce a contents sound, an output unit configured to output the contents sound which has been reproduced using the reproducing unit to a headphone, a talk detection unit configured to detect that a headphone fitter who fits the headphone talks with a person and an image normal position control unit configured to move the normal position of the image of the contents sound which has been reproduced using the reproducing unit to an arbitrary position when the talk detecting unit has detected that the headphone fitter has started talking with the person.

According to another embodiment of the present invention, there is provided a headphone including a reproducing unit configured to reproduce a contents sound, a loudspeaker configured to output the contents sound which has been reproduced using the reproducing unit, a talk detecting unit configured to detect that a headphone fitter who fits the headphone talks with a person and an image normal position control unit configured to, when the talk detecting unit detects that the headphone fitter has started talking with the person, move the normal position of the image of the contents sound which has been reproduced using the reproducing unit to an arbitrary position.

Owing to the above mentioned arrangement, it may become possible to automatically move the normal position of the image of a contents sound to the rear of a headphone fitter, under the assumption that the headphone fitter starts talking with a person who is present, for example, in the front of him. As a result, it may become possible to prevent the image of the voice of the person from overlapping the image of the contents sound and hence the headphone fitter may be permitted to talk with the person who is present in the front of him without removing the headphone from his head or depressing a reproduction stop button.

According to the embodiments of the present invention, it may become possible to automatically move the normal position of the image of a contents sound to the rear of a headphone fitter, under the assumption that a headphone fitter starts talking with a person who is present, for example, in the front of him. As a result, it may become possible to prevent the image of the voice of the person from overlapping the image of the contents sound and hence the headphone fitter may be permitted to talk with the person who is present in the front of him without removing the headphone from his head or depressing the reproduction stop button. Therefore, a reproducing device, a headphone and a reproducing method which are more increased in handiness in talking with a person than ever may be implemented.

DESCRIPTION OF THE PREFERRED EMBODIMENTS

Next, preferred embodiments of the present invention will be described with reference to the accompanying drawings. Description will be made in the following order.
1. Embodiment
2. Altered Embodiments
1. Embodiment
   1-1 Summary of Embodiment First, the summary of an embodiment of the present invention will be described and description of specific examples thereof will follow.

Figure 1:
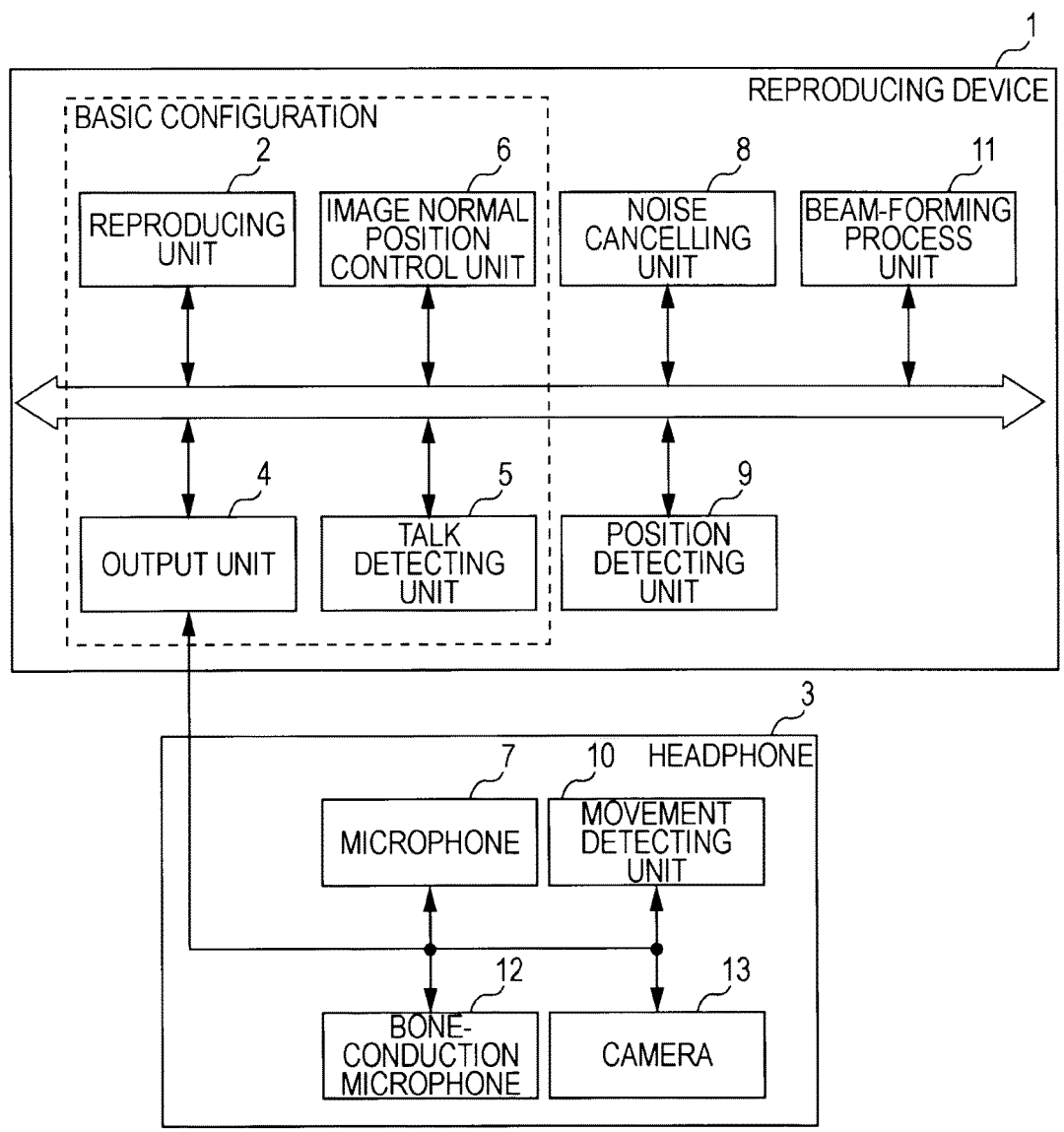
FIG. 1 is a block diagram illustrating an example of a configuration of a reproducing device according to an embodiment of the present invention.

In an example illustrated in FIG. 1, reproducing device 1 is described. The reproducing device 1 includes a reproducing unit 2 configured to reproduce a contents sound and an output unit 4 configured to output the contents sound which has been reproduced using the reproducing unit 2 to a headphone 3. The reproducing device 1 also includes a talk detecting unit 5 configured to detect that a headphone fitter talks with a person and an image normal position control unit 6 configured to, when the talk detecting unit 5 detects that the headphone fitter has started talking with the person, move the normal position of the image of the contents sound which has been reproduced using the reproducing unit 2 to an arbitrary position.

With the use of a configuration as mentioned above as a basic configuration, the reproducing device 1 may permit to automatically move the normal position of the image of the contents sound to the rear of the headphone fitter, under the assumption that the headphone fitter starts talking with a person who is present in the front of him. As a result, the image of the voice of the person is prevented from overlapping the image of the contents sound and hence the headphone fitter is permitted to talk with the person without removing the headphone from his head or depressing a reproduction stop button.

In addition, the reproducing device 1 may be configured such that the image normal position control unit 6 controls to move the normal position of the image of the contents sound which has been reproduced using the reproducing unit 2 back to its original position when the talk detecting unit 5 detects that the headphone fitter has finished talking with the person.

Likewise, the headphone 3 may include a microphone 7 configured to pick up external sounds. In the above mentioned case, in the reproducing device 1, the talk detecting unit 5 analyzes the external sounds which have been picked up using the microphone 7 and judges that the headphone fitter has started talking with the person when speaking of the headphone fitter to the person has been detected.

Likewise, in the reproducing device 1, the talk detecting unit 5 may be configured to analyze the external sounds which have been picked up using the microphone 7 and to judge that the headphone fitter has finished talking with the person when a state in which the headphone fitter does not speak to the person has lasted for a fixed time period.

Likewise, the reproducing device 1 may include a noise cancelling unit 8 configured to cancel noise by synthesizing a sound which is out of phase with the external sounds which have been picked up using the microphone 7 with the contents sound which has been reproduced using the reproducing unit 2. In the above mentioned case, the image normal position control unit 6 controls the noise cancelling unit 8 when it is detected that the headphone fitter has started talking with the person to bring noise cancellation into OFF state and to synthesize the external sounds which have been picked up using the microphone 7 with the contents sound which has been reproduced using the reproducing unit 2 simultaneously.

Likewise, in the reproducing device 1, the image normal position control unit 6 may be configured to move the normal position of the image of the reproduced contents sound to an arbitrary position when it is detected that the headphone fitter has started talking with the person and to decrease the volume of a sound in a frequency band which is the same as that of a human voice in the contents sound concerned.

Likewise, the reproducing device 1 may include a position detecting unit 9 configured to detect the position of the person who talks with the headphone fitter. In the above mentioned case, the image normal position control unit 6 controls to move the normal position of the image of the reproduced contents sound to a position which is different from that of the person which has been detected using the position detecting unit 9 when it is detected that the headphone fitter has started talking with the person.

Likewise, the headphone 3 may include a movement detecting unit 10 configured to detect a movement of the face of the headphone fitter. In the above mentioned case, in the reproducing device 1, the talk detecting unit 5 is configured to judge that the headphone fitter has started talking with the person, when the movement of the face which is detected using the movement detecting unit 10 has been changed to a predetermined movement.

Likewise, the reproducing device 1 may include a beamforming process unit 11 configured to perform a beamforming process for emphasizing only a sound which comes from a specific position on the external sounds which have been picked up using the microphone 7.

Likewise, the headphone 3 may include a bone-conduction microphone 12. In the above mentioned case, in the reproducing device 1, the talk detecting unit 5 is configured to judge, when the talk detecting unit 5 analyzes sounds which have been picked up using the bone-conduction microphone 12 and detects speaking of the headphone fitter to the person, that the headphone fitter has started talking with the person.

Likewise, the headphone 3 may include a camera 13 configured to photograph a subject which is present in the front of the headphone fitter. In the above mentioned case, in the reproducing device 1, the talk detecting unit 5 is configured to perform a person detecting process of detecting a person concerned from within an image which has been photographed using the camera 13 and to judge, in the case that the person is not detected any more as a result of execution of the person detecting process, that the headphone fitter has finished talking with the person.

Likewise, in the reproducing device 1, the image normal position control unit 6 may be configured to control the noise cancelling unit 8 to increase the volume of a sound in a predetermined frequency band which is included in the external sounds which have been picked up using the microphone 7 when the external sounds which have been picked up using the microphone 7 are synthesized with the reproduced contents sound.

Incidentally, FIG. 1 illustrates an example in which all the noise cancelling unit 8, the position detecting unit 9 and the beam-forming process unit 11 are included in the reproducing device 1. However, the above mentioned units may be appropriately included in the reproducing device 1 and it is not the case that all the units are typically included in the reproducing device 1.

Likewise, FIG. 1 illustrates the example in which all the microphone 7, the movement detecting unit 10, the bone-conduction microphone 12 and the camera 13 are included in the headphone 3. However, the above mentioned units may be appropriately included in the headphone 3 and it is not the case that all the units are typically included in the headphone 3.

In addition, in the summary of the embodiment, although the reproducing device 1 has been described as a device which is separated from the headphone 3, the basic configuration of the reproducing device 1 may be included in the headphone 3. In the above mentioned case, the same effects as the above may be obtained by configuring the headphone 3 as a single unit. In addition, a part (for example, the noise cancelling unit 8) may be included in the headphone 3.

1-2 Specific Examples of Embodiment 1-2-1 Configuration of Headphone

Figure 2:
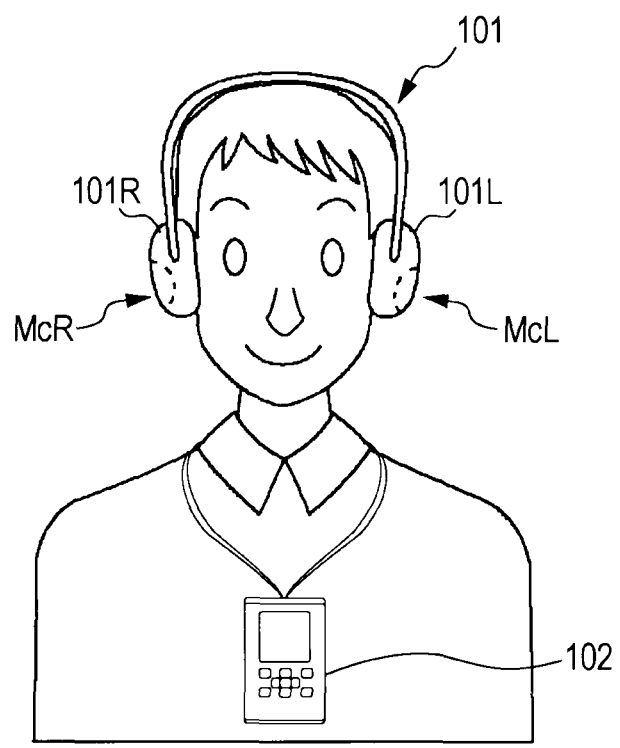
FIG. 2 is a schematic diagram illustrating a specific example of a configuration of a headphone system according to an embodiment of the present invention.

Next, specific examples of an embodiment of the present invention will be described. FIG. 2 illustrates a headphone system 100 with the NC function. The headphone system 100 includes a headphone 101 and a digital audio player (also called a DAP) 102. The headphone 101 is radio-connected with the DAP 102.

The DAP 102 includes a mass flash memory. Music data which is stored in the flash memory is decoded and a digital voice signal which is obtained as a result of execution of data decoding is transmitted to the headphone 101. The headphone 101 which has received the digital voice signal from the DAP 102 outputs a sound (that is, the music) on the basis of the digital voice signal.

In the headphone 101, mikes McL and McR configured to pick up external sounds are respectively included in left and right housing units 101L and 101R. The headphone 101 digitally processes the sounds which have been picked up using the mikes McL and McR to generate a sound which is out of phase with these sounds and mixes (synthesizes) the generated out-of-phase sound with the digital voice signal which has been received from the DAP 102 to reduce the sound (noise) from the outside.

Owing to the above mentioned operation, the headphone system 100 permits the headphone fitter (that is, a user) to listen to the music of clear tone quality which is reduced in the noise from the outside.

Incidentally, the headphone 101 and the DAP 102 are configured to communicate with each other in a state in which they recognize each other as communication mates by being subjected to pairing.

1-2-2 Internal Configurations of Headphone and DAP

Figure 3:
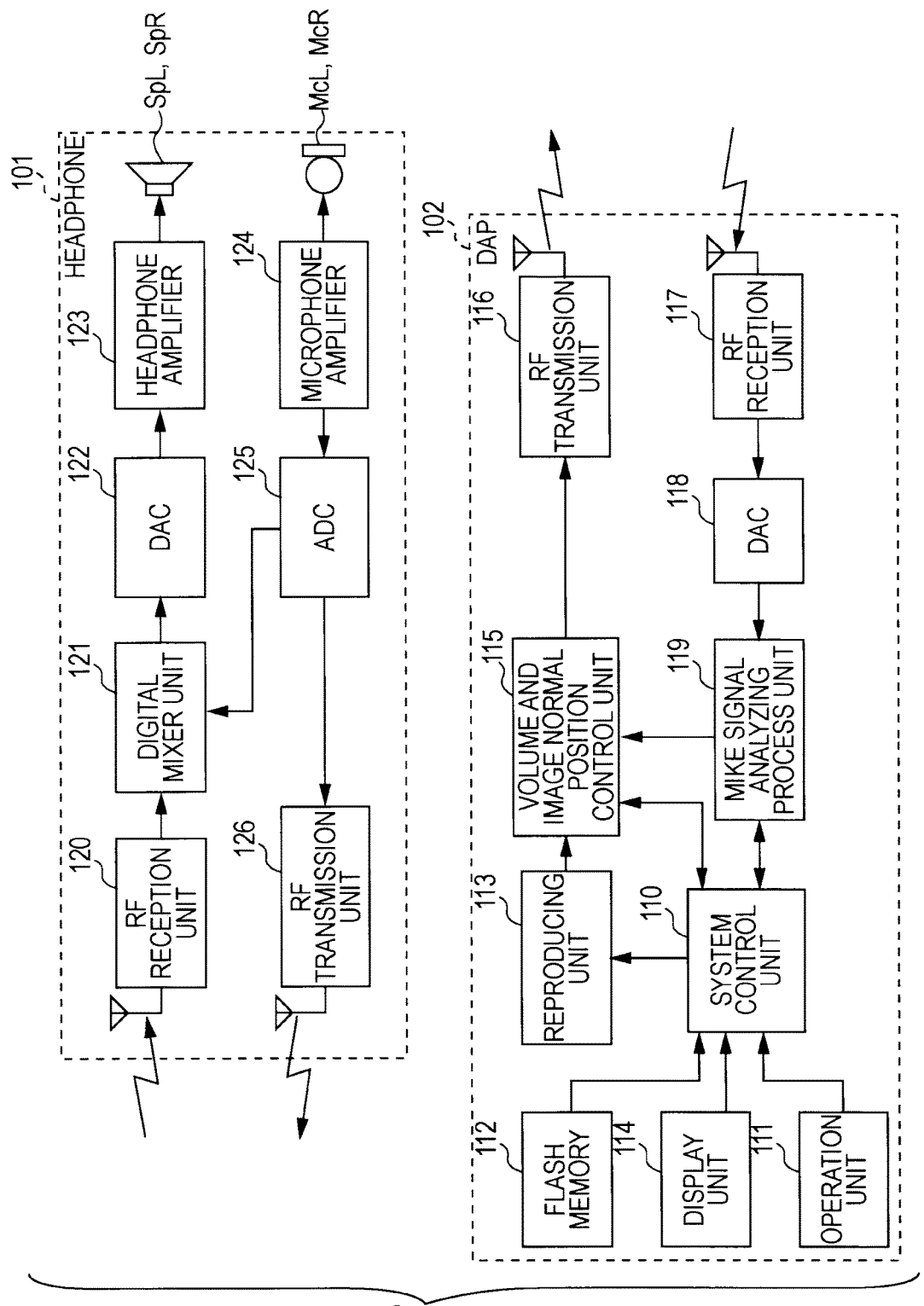
FIG. 3 is a block diagram illustrating examples of internal configurations of a headphone and a DAP.

Next, the internal configurations of the headphone 101 and the DAP 102 will be described with reference to FIG. 3. The DAP 102 is configured such that a system control unit 110 which includes a CPU, a ROM. A RAM and the like generally controls operations.

Specifically, the system control unit 110 recognizes that, for example, a reproducing operation has been performed by a user on the basis of an input signal from a control unit 111, reads music data out of a flash memory 112 and transmits the read music data to a reproducing unit 113. Simultaneously with the above mentioned operation, the system control unit 110 acquires information on the title of the music and the artist's name who plays the music from the read music data and makes a display unit 114 display the acquired information.

The reproducing unit 113 decodes the music data which has been read out of the flash memory 112 under the control of the system control unit 110 to obtain a digital voice signal and transmits the obtained digit voice signal to a volume and image normal position control unit 115.

The volume and image normal position control unit 115 performs an equalizing process of adjusting the volume per frequency band and image normal position processing of setting the normal position of an image on the digital voice signal which has been decoded using the reproducing unit 113.

The volume and image normal position control unit 115 operates in a listening mode which is suited when a headphone fitter intents to listen to music or in a talking mode which is suited when the headphone fitter intends to talk with a person.

In general, the volume and image normal position control unit 115 operates in the listening mode. In operation in the listening mode, the volume and image normal position control unit 115 performs the image normal position processing on the digital voice signal transmitted from the reproducing unit 113 such that the normal position of the image thereof is moved to the front of the headphone fitter and then transmits the digital voice signal to an RF transmission unit 116.

Incidentally, the digital voice signal which is transmitted from the reproducing unit 113 includes a voice signal for a left channel and a voice signal for a right channel and the volume and image normal position control unit 115 performs the image normal position processing respectively on both of them and then transmits signals so subjected to the image normal position processing to the RF transmit unit 116 as a set of digital voice signals (for the convenience of explanation, simply referred as the digital voice signal and the same thing also applies to other signals which will be described hereinbelow).

The RF transmission unit 116 converts the digital voice signal which has been transmitted from the volume and image normal position control unit 115 to an RF signal and then outputs the converted RF signal.

An RF reception unit 120 of the headphone 101 receives the RF signal which has been output from the RF transmission unit of the DAP 102 and converts the RF signal to a digital voice signal. The digital voice signal is then transmitted to a DAC (D/A converter) 122 via a digital mixer unit 121 and is converted to an analog voice signal.

Figure 4:
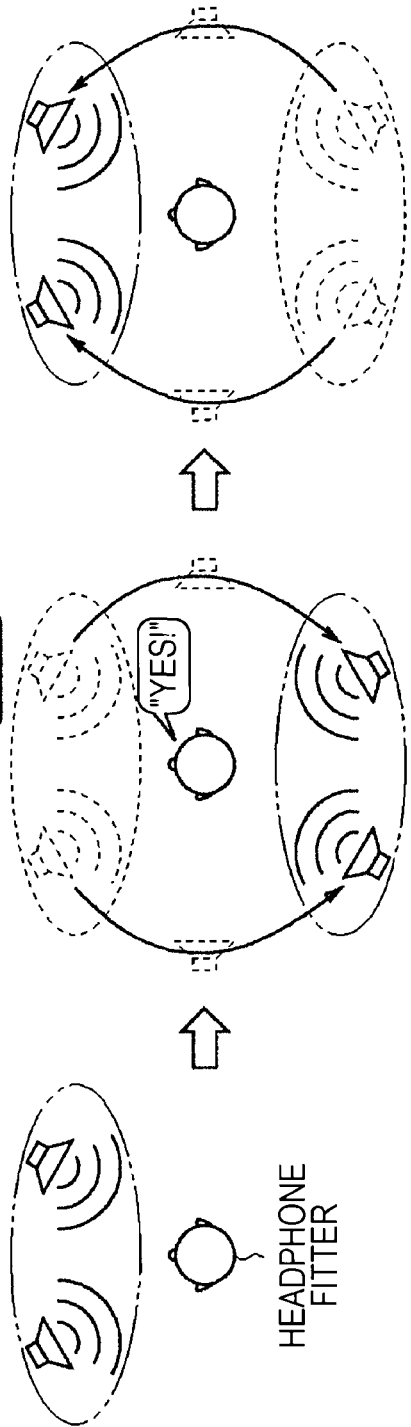
FIG. 4A is a schematic diagram illustrating an example of the normal position of the image of a sound in a listening mode.
FIG. 4B is a schematic diagram illustrating an example in which the normal position of the image of the sound has been moved to the rear of a headphone fitter in a talking mode.
FIG. 4C is a schematic diagram illustrating an example in which the normal position of the image of the sound has been returned to its original position in the listening mode.

The analog voice signal is then amplified using a headphone amplifier 123 and is output as a sound (that is, the music) from each of left and right loudspeakers SpL and SpR. In the above mentioned situation, the music reaches the headphone fitter's ears as if the music is output from left and right loudspeakers which are virtually installed in the front of him as illustrated in FIG. 4A owing to the above mentioned image normal position processing performed on the signal.

In addition, in the above mentioned situation, the external sound which has been picked up using each of the mikes McL and McR of the headphone 101 is amplified as an analog voice signal (also called a mike signal) using a mike amplifier 124 and then is transmitted to an ADC (A/D converter) 125 to be converted to a digital voice signal.

The digital voice signal is then transmitted to a digital mixer unit 121 and an RF transmission unit 126. The digital mixer unit 121 performs predetermined digital processing on the digital voice signal to generate a digital voice signal which is out of phase with the sound which has been picked up using each of the mikes McL and McR and mixes the generated digital voice signal with the digital voice signal which has been received from the DAP 102.

As a result, a noise cancelling effect is given to the voice which is output from each of the loudspeakers SpL and SpR and it may become possible for the headphone fitter to listen to the music of clear tone quality in which the external noise is reduced.

In addition, the RF transmission unit 126 converts the digital voice signal which has been converted using the ADC 125 to an RF signal to be output.

An RF reception unit 117 of the DAP unit 102 receives the RF signal which has been output from the RF transmission unit 126 of the headphone 101 and converts the RF signal to a digital voice signal. The digital voice signal is then sent to a DAC 118 and is converted to an analog vice signal (that is, a mike signal) and is sent to a mike signal analyzing process unit 119.

The mike signal analyzing process unit 119 performs an analyzing process on the mike signal to detect whether the headphone fitter has started talking with the person. Incidentally, the mike signal includes a mike signal of a sound which has been picked up using the left mike McL and a mike signal of a sound which has been picked up using the right mike McR and the mike signal analyzing process unit 119 performs the analyzing process respectively on both of the signals.

Then, the mike signal analyzing process unit 119 which detects that the headphone fitter has started talking with the person sends the volume and image normal position control unit 115 a notification that the headphone fitter has started talking with the person. Incidentally, a method of detecting that a headphone fitter has started talking with a person will be described later.

The volume and image normal position control unit 115 which has received the notification that the headphone fitter has started talking with the person recognizes that the state of the headphone fitter has been shifted from a music-listening state (also called a listening state) to a conversation-having state (also called a talking state).

In response to the above operation, the volume and image normal position control unit 115 shifts the mode from the listening mode to the talking mode and sends a control signal to bring the NC function into OFF state to the RF transmission unit 116 together with the digital voice signal which is sent from the reproducing unit 113. The control signal is output from the RF transmission unit 116 together with the digital voice signal, is received by an RF reception unit 120 of the headphone 101 and is then sent to a digital mixer unit 121.

The digital mixer unit 121 brings the NC function into OFF state on the basis of the control signal. Specifically, the digital mixer unit 121 mixes the digital voice signal of the sound which has been picked up using each of the mikes McL and McR with the digital voice signal which has been received from the DAP 102 without inverting the phase thereof.

As a result, the voice of the person who talks with the headphone fitter and the music which is being reproduced are output from each of the left and right loudspeakers SpL and SpR of the headphone 101.

Incidentally, in general, a person who intends to talk with the headphone fitter talks with the headphone fitter face to face with him and hence the person is present in the front of the headphone fitter. Thus, the voice of the person which has been picked up using each of the mikes McL and McR and is output from each of the loudspeakers SpL and SpR will be heard from the front of the headphone fitter.

In the above mentioned situation, if the image of the music which is being reproduced is positioned in the front of the headphone fitter, the image of the music which is being reproduced will be mixed with the image of the voice of the person and it will become difficult for the headphone fitter to catch the voice of the person.

Accordingly, the headphone system 100 is configured such that the normal position of the image of the music which is being reproduced is moved to the rear of the headphone fitter while he is talking with the person such that the image of the voice of the person who talks with the headphone fitter is not mixed with the image of the music which is being reproduced.

Specifically, the volume and image normal position control unit 115 which has shifted to the talking mode performs the image normal position processing on each of digital voice signals which are sequentially sent from the reproducing unit 113 such that the normal position of the image of each digital voice signal is moved from the front to the rear of the headphone fitter.

The digital voice signal which has been subjected to the image normal position processing in the above mentioned manner is output from the RF transmission unit 116, is received by the RF reception unit 120 of the headphone 101 and is output from each of the left and right loudspeakers SpL and SpR of the headphone 101 as the sound (the music). In the above mentioned situation, the music is heard to the headphone fitter as if the left and right loudspeakers which have been installed in the front of him so far are moved to the rear of him and the music is output from the loudspeakers which are installed at the rear of him as illustrated in FIG. 4B.

In the above mentioned manner, in the headphone system 100, it may become possible to prevent the voice of the person from becoming hardly audible by avoiding a situation that the image of the voice of the person who talks with the headphone fitter overlaps the image of the music which is being reproduced. As a result, the headphone system 100 may permit the headphone fitter to talk with the person who is present in the front of him with the headphone 101 fitted on his head and without performing any operation to stop listening to the music which is being reproduced.

Then, the mike signal analyzing process unit 119 detects that the headphone fitter has finished talking with the person by performing the analyzing process on each mike signal and sends the volume and image normal position control unit 115 a notification that the headphone fitter has finished talking with the person. Incidentally, a method of detecting that a headphone fitter has finished talking with a person will be also described later.

The volume and image normal position control unit 115 which has received the notification that the headphone fitter has finished talking with the person recognizes that the state of the headphone fitter has been shifted from the talking state to the listening state.

Thus, the volume and image normal position control unit 115 shifts back to the listening mode and sends a control signal used to bring the NC function into ON state to the RF transmission unit 116 together with the digital voice signal sent from the reproducing unit 113.

The control signal is output from the RF transmission unit 116 together with the digital voice signal, is received by the RF reception unit 120 of the headphone 101 and is sent to the digital mixer unit 121. The digital mixer unit 121 brings the NC function into ON state on the basis of the control signal.

As a result, the noise cancelling effect is again given to the voice which is output from each of the loudspeakers SpL and SpR of the headphone 101 so as to permit the headphone fitter to listen to the music of clear tone quality in which the external noise is reduced.

Simultaneously with the above mentioned operation, the volume and image normal position control unit 115 performs the image normal position processing on the digital voice signal which is sent from the reproducing unit 113 such that the normal position of the image thereof is moved from the rear to the front of the headphone fitter.

The digital voice signal which has been subjected to the image normal position processing in the above mentioned manner is output from the RF transmission unit 116, is received by the RF reception unit 120 of the headphone 101 and is then output from each of the left and right loudspeakers SpL and SpR of the headphone 101 as the sound (the music). In the above mentioned situation, the music is heard to the headphone fitter as if the left and right loudspeakers which have been installed at the rear of him so far are moved to the front of him and the music is output from the loudspeakers which are installed in the front of him.

As described above, the headphone system 100 is configured such that when the headphone fitter has finished talking with the person, the mode is automatically shifted from the talking mode back to the listening mode.

That is, the headphone system 100 according to this embodiment is configured to automatically detect the state (the talking state or the listening state) of the headphone fitter and shift the mode to a mode which is suited for the detected state of the headphone fitter. Owing to the above mentioned operation, with the use of the headphone system 100, it may become possible for headphone fitter to listen to the music and talk with a person with the headphone 101 fitted on his head and without performing any mode switching operation.

Incidentally, the specific example of the reproducing device 1 which has been described in Summary of Embodiments may be given as an example of the DAP 102 and the specific example of the headphone 3 may be given as an example of the headphone 101. Likewise, the specific example of the reproducing unit 2 of the reproducing device 1 which has been described in Summary of Embodiments may be given as an example of the reproducing unit 113 of the DAP 102 and the specific example of the output unit 4 of the reproducing device 1 may be given as an example of the RF transmission unit 116 of the DAP 102. Then, the specific example of the talk detecting unit 5 of the reproducing device 1 may be given as an example of the mike signal analyzing process unit 119 of the DAP 102. Then, the specific example of the image normal position control unit 6 of the reproducing device 1 may be given as an example of the volume and image normal position control unit 115 of the DAP 102. Then, the specific example of the microphone 7 of the headphone which has been described in Summary of Embodiments may be given as an example of the mikes McL and McR of the headphone 101.

1-2-3 Detection of Start and Finish of Headphone Fitter's Talking and Mode Shifting Timing Next, detection that the headphone fitter has started talking with a person and has finished talking with the person and mode shifting timing will be described in detail.

The mike signal analyzing process unit 119 is configured to typically perform the analyzing process of judging whether the headphone fitter is speaking to the person on each mike signal. Specifically, the mike signal analyzing process unit 119 monitors signal levels of the left and right mike signals and when the left and right signal levels are almost equal to each other and are higher than a threshold value, judges that the headphone fitter is speaking to the person. This judging method is performed on the basis of a way of thinking that the mouth of the headphone fitter is a sound source which is situated apart from the mikes McL and McR at equal intervals and in the most vicinity of the mikes and the signal levels of the left and right mike signals become almost equal to each other and are increased when the headphone fitter is speaking to the person.

In reality, the mike signal analyzing process unit 119 judges that the headphone fitter has started talking with the person when it is judged that the headphone fitter is speaking to the person in the listening mode.

Then, the mike signal analyzing process unit 119 sends the volume and image normal position control unit 115 a notification that the headphone fitter has started talking with the person. Thus, the volume and image normal position control unit 115 shifts the mode from the listening mode to the talking mode.

Even after mode shifting, the mike signal analyzing unit 119 continuously performs the analyzing process. That is, the mike signal analyzing process unit 119 keeps monitoring the signal levels of the left and right mike signals. Then, when a state in which the left and right signal levels are lower than the predetermined threshold value, that is, the headphone fitter does not speak to the person lasts for a predetermined time (for example, several seconds), the mike signal analyzing process unit 119 judges that the headphone fitter has finished talking with the person.

Then, the mike signal analyzing process unit 119 sends the volume and image normal position control unit 115 a notification that the headphone fitter has finished talking with the person. Thus, the volume and image normal position control unit 115 shifts the mode from the talking mode back to the listening mode.

As described above, the headphone system 100 is configured to detect that the headphone fitter has started or finished talking with the person depending on whether the headphone fitter speaks to the person, thereby performing automatic mode shifting.

Figure 5:
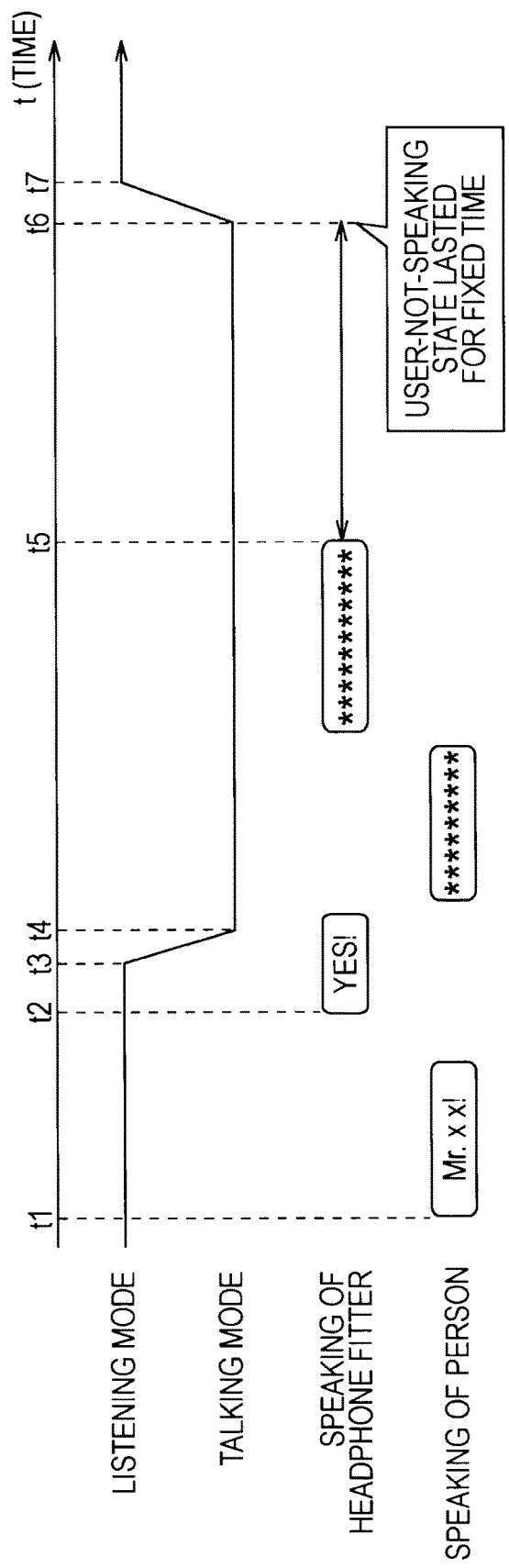
FIG. 5 is a diagram illustrating an example of a timing chart indicating timing of mode shifting from a listening mode to a talking mode and then back to the listening mode.

A specific example of mode shifting timing is illustrated in a timing chart in FIG. 5. First, it is assumed that the headphone system 100 operates in the listening mode and a headphone fitter listens to the music which is output from the headphone 101.

In the above mentioned situation, at a time t1, it is assumed that the headphone fitter was called out from a person who is present in the front of him, saying that "Mr. * *!".

At a time t2, it is assumed that the headphone fitter gave a reply, saying that "Yes". In the above mentioned situation, in the headphone system 100, although the NC function is in ON state, it is not the case that the sound from the outside is completely cancelled, and the headphone fitter is in a state in which he may catch the external sound to some extent.

At the time t2, the signal levels of the left and right mike signals become almost equal to each other and higher than the predetermined threshold value. On the basis of the above mentioned situation, the mike signal analyzing process unit 119 judges that the headphone fitter has started speaking to the person and notifies the volume and image normal position control unit 115 of the judgment.

Then, the volume and image normal position control unit 115 switches the mode from the listening mode to the talking mode at a time t3. At that time, the volume and image normal position control unit 115 performs the image normal position processing such that the normal position of the image of the reproduced sound (the music) is continuously moved from the front to the rear of the headphone fitter in a fixed time (for example, several seconds) counted from the time t3 to a time t4.

As described above, the volume and image normal position control unit 115 is configured to continuously move the normal position of the image of the reproduced sound from the front to the rear of the headphone fitter. By moving the normal position of the image in the above mentioned manner, it may become possible to make the headphone fitter recognize that the mode has been shifted from the listening mode to the talking mode with a more natural feeling.

After that, it is assumed that the headphone fitter kept talking with the person. Then, at a time t5, it is assumed that a state in which any conversation is not exchanged lasted for a fixed time after the headphone fitter has finished speaking to the person.

The above mentioned situation means that a state in which the signal levels of the mike signals are lower than the threshold value lasted for a fixed time. Thus, at a time t6, the mike signal analyzing process unit 119 judges that the headphone fitter has finished talking with the person and notifies the volume and image normal position control unit 115 of this judgment.

Then, at the time t6, the volume and image normal position control unit 115 switches the mode from the talking mode to the listening mode. In the above mentioned case, the volume and image normal position control unit 115 performs the image normal position processing so as to continuously move the normal position of the image of the reproduced sound from the rear to the front of the headphone fitter in a fixed time (for example, several seconds) counted from the time t6 to a time t7.

Also in the above mentioned case, it may become possible to make the headphone fitter recognize that the mode has been shifted from the talking mode to the listening mode with a more natural feeling by continuously moving the normal position of the image of the reproduced sound from the rear to the front of the headphone fitter.

The headphone system 100 is configured to shift the mode from the listening mode to the talking mode and then from the talking mode back to the listening mode in the above mentioned manner.

Incidentally, a method of moving the normal position of an image to an arbitrary position is widely recognized as disclosed, for example, in Japanese Laid-open Patent Publication No. 2009-44263. Specifically, for example, a digital voice signal is input into an image normal position processing circuit (not illustrated) including an image normal position filter for a left channel and an image normal position filter for a right channel. The image normal position processing circuit performs convolutional arithmetic processing on the digital voice signal using the image normal position filters for the left channel and the right channel to generate a voice signal for the left channel and a voice signal for the right channel.

At that time, the image normal position processing circuit may be capable of positioning the image of each voice which is generated on the basis of each digital voice signal to a desired normal position by changing coefficient values of the image normal position filters for the left and right channels with a head transfer function conforming to the desired normal position.

Therefore, owing to installation of an image normal position processing circuit as mentioned above in the volume and image normal position control unit 115, it may become possible to move the normal position of the image of each reproduced sound to an arbitrary position by performing the above mentioned image normal position processing using the image normal position processing circuit.

1-2-4 Mode Shifting Process Procedure

Figure 6:
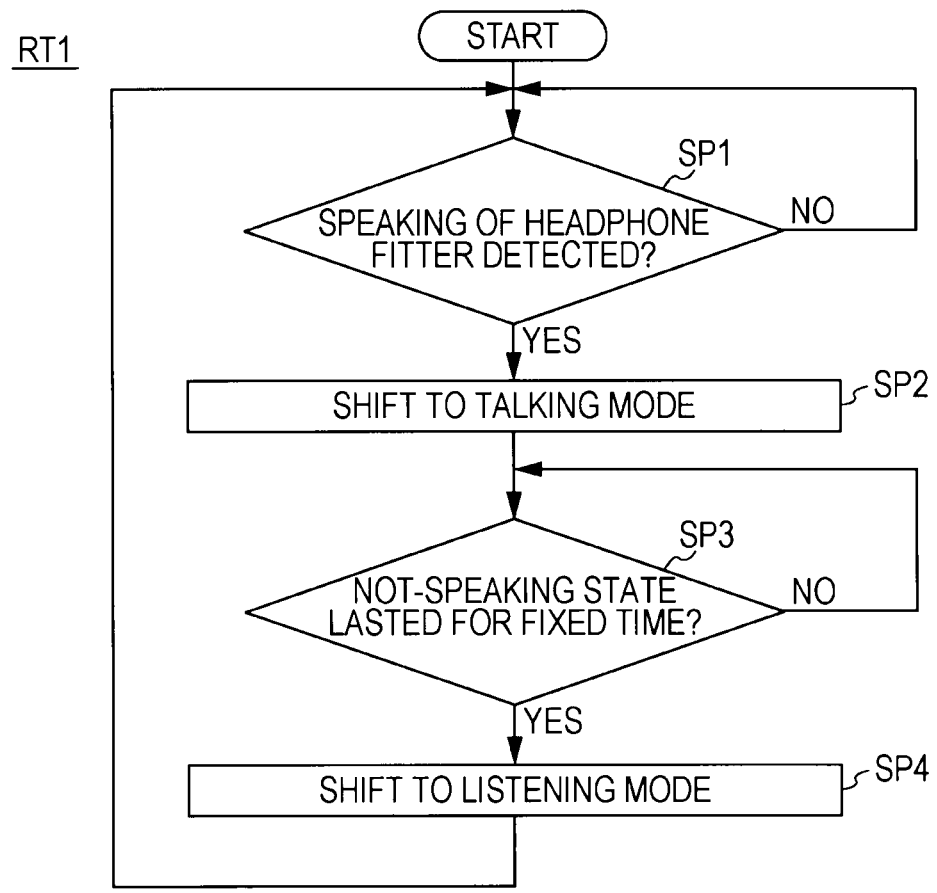
FIG. 6 is a diagram illustrating an example of a flowchart indicating procedures of a mode shifting process.

Next, an example of procedure executed in mode shifting as described above (also called mode shifting process procedure) RT1 will be described with reference to a flowchart illustrated in FIG. 6.

Incidentally, the mode shifting process procedure RT1 is procedure that the system control unit 110 executes by controlling respective units in accordance with a program stored in the ROM.

In the example illustrated in the drawing, first, it is assumed that the volume and image normal position control unit 115 operates in the listening mode in accordance with a reproducing operation performed by a user under the control of the system control unit 110.

In the above mentioned situation, the mike signal analyzing process unit 119 waits until speaking of a headphone fitter is detected at step SP1 of the mode shifting process procedure RT1 under the control of the system control unit 110. Then, when speaking of the headphone fitter is detected, the mike signal analyzing process unit 119 judges that the headphone fitter has started talking with a person and sends the volume and image normal position control unit 115 a notification that the headphone fitter has started talking with the person.

The volume and image normal position control unit 115 which has received the notification that the headphone fitter has started talking with the person shifts the mode from the listening mode to the talking mode at step SP2.

Then, at step SP3, the mike signal analyzing process unit 119 waits until a state in which the headphone fitter does not speak to the person lasts for a fixed time. Then, when a state in which the headphone fitter does not speak to the person lasts for the fixed time, the mike signal analyzing process unit 119 judges that the headphone fitter has finished talking with the person and sends the volume and image normal position control unit 115 a notification that the headphone fitter has finished talking with the person.

The volume and image normal position control unit 115 which has received the notification that the headphone fitter has finished talking with the person shifts the mode from the talking mode back to the listening mode at step SP4.

Then, again at step SP1, the mike signal analyzing process unit 119 waits until speaking of the headphone fitter is detected.

The headphone system 100 is configured to perform mode shifting in accordance with the above mentioned mode shifting process procedure RT1.

1-2-5 Operations and Effects

In the above mentioned configurations, the headphone system 100 operates in the listening mode which is suited for the headphone fitter to listen to the music when the headphone fitter performs a reproducing operation for reproducing the music.

In the above mentioned case, the headphone system 100 operates to bring the NC function into ON state and to make the volume and image normal position control unit 115 perform the image normal position processing so as to move the normal position of the image of the reproduced sound (that is, the music) to the front of the headphone fitter.

Owing to the above mentioned operation, the headphone system 100 operates to permit the headphone fitter to listen to the music of clear tone quality with such a feeling that as if the music is output from loudspeakers (not illustrated) which are installed in the front of the headphone fitter in the listening mode.

In addition, in the listening mode, the headphone system 100 analyzes the external sounds which have been picked up using each of the mikes McL and McR for the NC function to detect whether the headphone fitter has started talking with the person. Then, when it is detected that the headphone fitter has started talking with the person, the headphone system 100 automatically shifts the mode from the listening mode to the talking mode which is suited for the headphone fitter to talk with the person.

In the above mentioned case, the headphone system 100 brings the NC function into OFF state and outputs the external sounds (that is, the voice of the person and the voice of the headphone fitter) which have been picked up using each of the mikes McL and McR for the NC function and the reproduced sound from the headphone 101. In the above mentioned situation, the headphone system 100 makes the volume and image normal position control unit 115 perform the image normal position processing so as to move the normal position of the image of the reproduced sound (that is, the music) to the rear of the headphone fitter.

Owing to the above mentioned operation, the headphone system 100 may avoid such a situation that in the talking mode, the image of the voice of the person who is present in the front of the headphone fitter and the image of the reproduced sound which are output from the headphone 101 are mixed with each other to make the voice of the person hardly audible.

Thus, with the use of the headphone system 100, it may become possible to automatically shift the mode from the listening mode to the talking mode to make the headphone fitter talk with the person who is present in the front of him without removing the headphone 101 from his head and performing operations to stop the reproduced sound.

In addition, in the talking mode, the headphone system 100 analyzes the external sounds which have been picked up using each of the mikes McL and McR for the NC function to detect whether the headphone fitter has finished talking with the person. Then, when it is detected that the headphone fitter has finished talking with the person, the headphone system 100 shifts the mode from the talking mode back to the listening mode.

As described above, the headphone system 100 operates to automatically judge the current state of the headphone fitter (the talking state or the listening state) so as to automatically perform mode shifting suited for the detected state of the headphone fitter. Owing to the above mentioned operation, the headphone system 100 permits the headphone fitter to listen to the music and to talk with a person with the headphone fitted on his head and without performing any operation for mode switching.

According to the above mentioned configurations, the headphone system 100 may be capable of avoiding such a situation that the image of the voice of the person overlaps the image of the reproduced sound to make the headphone fitter hardly catch the voice of the person, by moving the normal position of the image of the reproduced sound to the rear of the headphone fitter when it is detected that the headphone fitter has started talking with the person. Owing to the above mentioned operation, the headphone system 100 permits the headphone fitter to talk with the person which is present in the front of him with the headphone fitted on his head and without performing any operation to stop the reproduced sound.

2. Altered Embodiments 2-1 Altered Embodiment 1

In the above mentioned embodiments, an example which is configured such that in response to mode-shifting to the talking mode, the volume and image normal position control unit 115 controls to move the normal position of the image of the reproduced sound to the rear of the headphone fitter has been described.

In the above mentioned situation, the volume of a vocal part in the reproduced sound which is the same as the voice of the person who talks with the headphone fitter in frequency band may be decreased. In the above mentioned case, the volume and image normal position control unit 115 performs a volume adjusting process of decreasing the volume of the sound in the frequency band corresponding to that of the vocal part on the digital voice signal.

Owing to the above mentioned operation, the volume of the vocal part in the reproduced sound is decreased and hence it may become possible for the headphone fitter to catch the voice of the person who talks with him more clearly.

In addition to the above mentioned configuration, the normal position of the image of the reproduced sound may be moved to above the head of the headphone fitter in place of the rear of the headphone fitter. In the above mentioned situation, the normal position of the image of the reproduced sound is moved to a position which is separated from the headphone fitter so as not to interrupt the voice of the person who talks with the headphone fitter. Owing to the above mentioned operation, it may become possible for the headphone fitter to talk with the person while listening to the reproduced sound like BGM.

Likewise, a distance between the headphone fitter and the normal position of the image of the reproduced sound may be changed, for example, in accordance with the signal levels of the mike signals (that is, the sounds which have been picked up using the mikes McL and McR).

In reality, it may be thought that when the signal levels of the mike signals are high, the headphone fitter speaks to the mate in a loud voice. In the above mentioned case, it may be supposed that the distance between the headphone fitter and the person who talks with him is so long that the voice of the person is heard to the headphone fitter in whispers. Thus, in the above mentioned situation, the normal position of the image of the reproduced sound is set away from the headphone fitter so as to decrease the volume of the reproduced sound. As a result, it may become possible for the headphone fitter to sufficiently catch the voice of the person no matter how far the headphone fitter is apart from the person who talks with him.

2-2 Altered Embodiment 2

In the above mentioned embodiment, an example which is configured such that the normal position of the image of the reproduced sound is moved to the rear of the headphone fitter such that the image of the voice of the person does not overlap the image of the reproduced sound under the assumption that the person who talks with the headphone fitter is present in the front of the headphone fitter has been described.

In addition to the above mentioned configuration, the position of the person which is observed from the side of the headphone fitter may be specified to move the normal position of the image of the reproduced sound to a position opposed to the position of the person with the headphone fitter at the center.

In the above mentioned case, in order to specify the position of the person which is observed from the side of the headphone fitter, a technique for performing a beam-forming process may be used.

A technique for performing a beam-forming process is widely recognized as disclosed, for example, in Japanese Laid-open Patent Publication No. 2008-193420. Briefly speaking, sounds generated from a sound source are picked up using a plurality of microphones. Then, voice signals of the sounds which have been picked up using the plurality of microphones are delayed and synthesized with one another to generate a synthetic signal. In the above mentioned case, the signal level of the synthetic signal is detected while changing a delay time on the basis of the delay time which is prepared for each position and the position corresponding to the delay time at which the signal level is maximized is defined as the position of the sound source.

The mike signal analyzing process unit 119 may be configured to specify the position of the sound source, that is, the position of the person who talks with the headphone fitter by using a technique as mentioned above.

Then, the mike signal analyzing process unit 119 operates to notify the volume and image normal position control unit 115 of the position of the person. The volume and image normal position control unit 115 which has received the notification of the position of the person controls to move the normal position of the image of the reproduced sound to the position opposed to the position of the person with the headphone fitter at the center.

By moving the normal position of the image of the reproduced sound in the above mentioned manner, it may become possible to separate the normal position of the image of the voice of the person from the normal position of the image of the reproduced sound with certainty regardless of displacement of the position of the person from the front of the headphone fitter. Incidentally, the mike signal analyzing process unit 119 which is used in the above mentioned operation may be given as a specific example of the position detecting unit 9 in the reproducing device 1 which has been described with reference to FIG. 1.

In the above mentioned example, the normal position of the image of the reproduced sound is moved to the position opposed to the position of the person with the headphone fitter at the center. However, the way of moving the normal position is not limited to the above. In short, the normal position of the image of the reproduced sound has only to move such that the image of the reproduced sound does not overlap the image of the voice of the person.

Incidentally, in the case that the position of a sound source which is situated in the front of the headphone fitter is specified, any problem may not occur even when the number of microphones used for performing the beam-forming process is two. However, in the case that it is favorable to specify the position over a wider range or to specify the position with higher accuracy, the number of the microphones may be increased to three or more.

In the above mentioned example, the position of the sound source is specified. However, when once only the direction is specified, the same effect may be obtained by moving the normal position of the image of the reproduced sound in a direction which is different from a direction in which the person who talks with the headphone fitter is present with the headphone fitter at the center.

On the other hand, it may be also possible to emphasize only the voice which comes from a specific direction, that is, only the voice of a person who talks with the headphone fitter in the external sounds which have been picked up using the mikes McL and McR by utilizing a technique for performing a beam-forming process.

In the above mentioned case, the mike signal analyzing process unit 119 specifies the position (it may be assumed to be the front) of the person who talks with the headphone fitter and then sets a delay time for each voice signal in the sounds which have been picked up using the mikes McL and McR so as to emphasize only the voice of the person who talks with the headphone fitter. Then, the mike signal analyzing process unit 119 notifies the volume and image normal position control unit 115 of the delay time. The volume and image normal position control unit 115 sends the RF transmission unit 116 a control signal indicating the delay time.

The control signal is then sent to the digital mixer unit 121 of the headphone 101. The digital mixer unit 121 performs a beam-forming process on each digital voice signal in the sounds which have been picked up using the mikes McL and McR so as to emphasize only the voice of the person who talks with the headphone fitter on the basis of the delay time indicated by the control signal.

As a result, voices in which only the voice of the person is emphasized are output from the loudspeakers SoL and SoR of the headphone 101 as the sounds which have been picked up from the outside.

Combined use of a beam-forming technique as mentioned above with the above mentioned technique for moving the normal position of the image may prevent the image of the voice of the person from overlapping the image of the reproduced sound and make the headphone fitter catch the voice of the person who talks with him more clearly.

2-3 Altered Embodiment 3

In the above mentioned embodiment, an example which is configured such that the external sounds which have been picked up using each of the mikes McL and McR for the NC function are analyzed to judge that the headphone fitter has started talking with the person in accordance with detection of speaking of the headphone fitter has been described.

In addition to the above mentioned configuration, detection that the headphone fitter has started talking with the person may be performed by using various methods other than the above.

For example, it may be judged that the headphone fitter has started talking with the person when an operation that the face of the headphone fitter turns toward the sound source (that is, the person who will talk with the headphone fitter) is detected.

In the above mentioned case, for example, a technique for performing a beam-forming process is utilized. Specifically, the mike signal analyzing process unit 119 analyzes the mike signals to detect displacement of the position (that is, the position of the person who will talk with the headphone fitter) of the sound source which exhibits the signal levels which are higher than a threshold value. Then, when it is detected that the sound source has moved from a certain position to the front of the headphone fitter in a predetermined time period as the face of the headphone fitter turns toward the person, the mike signal analyzing process unit 119 may judge that the headphone fitter will start talking with the person.

In addition, for example, an acceleration sensor for detecting a movement of the face of the headphone fitter may be included in the headphone 101 so as to judge whether the headphone fitter will start talking with the person in accordance with the movement of the face which is obtained from the acceleration sensor and displacement of the position of the sound source which is detected in the above mentioned manner. Incidentally, the acceleration sensor may be given as a specific example of the movement detecting unit 10 of the headphone 3 which has been described with reference to FIG. 1.

In the above mentioned case, the headphone 101 may be configured such that an output signal from the acceleration sensor is input into the mike signal analyzing process unit 119. Then, the mike signal analyzing process unit 119 may operate to judge that the headphone fitter will start talking with the person, by detecting that as the sound source moved to the front of the headphone fitter in a predetermined time period, the face of the headphone fitter moved right and left.

Likewise, the headphone 101 may be configured such that it is judged that the headphone fitter has started talking with the person when behavior that the headphone fitter turns his face (shakes his head) right and left which is exhibited when he tries to look for the position of the sound source (that is, the person who will talk with the headphone fitter) has been detected.

Likewise, the headphone 101 may be also configured such that it is judged that the headphone fitter has started talking with the person when behavior that the headphone fitter turns his face (shakes his head) up and down which is exhibited when he is called out from the person and he nods has been detected.

In the above mentioned cases, the mike signal analyzing process unit 119 may operate to analyze an output signal from the acceleration sensor included in the headphone 101 to detect the movement of the face of the headphone fitter.

Likewise, a bone-conduction microphone may be included in the headphone 101 to judge that the headphone fitter has stated talking with the person when speaking (or nod) of the headphone fitter has been detected from within sounds which have been picked up using the bone-conduction microphone. Use of the bone-conduction microphone may realize more accurate detection of speaking of the headphone fitter.

Likewise, the headphone 101 may be also configured such that it is judged that the headphone fitter has started talking with the person when the signal levels of mike signals are higher than a predetermined threshold value and a word such as "Yes", "Hi", "I'm x x" or the like which is typically used when one person starts talking with another person has been detected from the mike signals.

In the above mentioned case, the headphone 101 may be also configured such that it is also judged that the headphone fitter has started talking with the person, by detecting speaking of the person such as 'Mr. x x", "Hi" or the like in addition to detection of speaking of the headphone fitter.

In the above mentioned embodiment, an example which is configured such that it is judged that the headphone fitter has started talking with the person when the mike signals are monitored and the signals levels of the left and right mikes are almost equal to each other and are higher than the predetermined threshold value has been described. In the above mentioned case, judgment as to whether a component of the voice of a human being is included in the mike signals may be added as one of conditions for judgment. By adding the above mentioned judgment, more accurate judgment that the headphone fitter has started talking with the person may be realized.

In addition, in order to realize more accurate judgment that the headphone fitter has started talking with the person, the above mentioned various judging methods may be combined with one another. For example, it may be judged that the headphone fitter will start talking with the person on the basis of detection of speaking of the person and detection of turning of the face of the headphone fitter right and left simultaneously.

2-4 Altered Embodiment 4

In the above mentioned embodiment, an example which is configured such that it is judged that the headphone fitter has finished talking with the person when it is detected that a state in which the headphone fitter does not speak to the person lasted for the fixed time as a result of analysis of external sounds which have been picked up using the mikes McL and McR for the NC function has been described.

In addition to the above mentioned configuration, the headphone 101 may be configured to detect that the headphone fitter has finished talking with the person by using various methods other than the above.

It may be judged that the headphone fitter has finished talking with the person, for example, when it is detected that a person has gone away from the front of the headphone fitter.

In the above mentioned case, for example, a camera that photographs a subject which is present in the front of the headphone fitter may be included in the headphone 101 such that the system control unit 110 of the DAP 102 performs a person detecting process on an image which has been taken using the camera. Then, a result of execution of the person detecting process may be sent to the mike signal analyzing process unit 119. The mike signal analyzing process unit 119 may judge that the headphone fitter has finished talking with the person when the person has not been detected any more on the basis of the result of the person detecting process which has been sent from the system control unit 110.

In addition, for example, a person sensor configured to detect whether a person is present in the front of the headphone fitter may be included in the headphone 101 in place of the camera.

In addition, the headphone 101 may be configured such that it is judged that the headphone fitter has finished talking with the person when a state in which the person does not speak to the headphone fitter lasted for a fixed time, in place of judgment on the basis of speaking of the headphone fitter.

In the above mentioned case, the above mentioned technique for performing the beam-forming process is utilized to emphasize, for example, only the voice (that is, the voice of the person) which comes from the front in the external sounds which have been picked up using each of the mikes McL and McR. As a result, a mike signal in which only the voice of the person is emphasized may be obtained from each of the mikes.

Then, it is judged that the headphone fitter has finished talking with the person when a state in which the signal levels of the mike signals are less than a predetermined threshold value, that is, the person does not speak to the headphone fitter lasted for a fixed time.

2-5 Altered Embodiment 5

In the above mentioned embodiment, an example which is configured such that the image normal position processing is performed on the digital voice signal which has been decoded using the reproducing unit 133 such that the normal position of the image of the reproduced sound is moved to the front of the headphone fitter in the listening mode has been described.

In addition to the above mentioned configuration, the headphone 101 may be configured such that the reproduced sound is output as it is without performing the image normal position processing on the reproduced sound in the listening mode.

2-6 Altered Embodiment 6

In the above mentioned embodiment, an example which is configured such that the external sounds which have been picked up using the mikes McL and McR are output from the loudspeakers SpL and SpR of the headphone 101 together with the reproduced sound in the talking mode has been described.

In the above mentioned case, in the picked up external sounds, the volume of a sound in a frequency band (for example, a high frequency band) that a person (in particular, an aged-person) hardly catches may be increased to be output.

In the above mentioned case, the digital mixer unit 121 performs an equalizing process of increasing the volume of the sound in the frequency band that the aged-person hardly catches on each digital voice signal in the sounds which have been picked up using the mikes McL and McR.

In addition to the above mentioned configuration, an equalizing process of increasing the volume of a sound in a frequency band which is the same as that of a voice of a human being may be performed on each digital voice signal in the sounds which have been picked up using the mikes McL and McR.

By performing the equalizing process in the above mentioned manner, it may become possible for the headphone fitter to catch the voice of himself and the voice of the person who talks with him more clearly.

In addition, a screen used to adjust the volume of a sound in a certain frequency band may be displayed on the display unit 114 of the DAP 102 such that a user may adjust the volume. In the above mentioned case, adjustment of the volume of the sound in a certain frequency band may be performed respectively on the sound which has been picked up using the mike McL and on the sound which has been picked up using the mike McR.

2-7 Altered Embodiment 7

In the above mentioned embodiment, an example which is configured such that the present invention is applied to the headphone system 100 in which the headphone 101 is radio-connected with the DAP 102 has been described.

In addition to the above mentioned configuration, the embodiment of the present invention may be applied to a headphone system in which the headphone 101 is connected with the DAP 102 via a cable.

Figure 7:
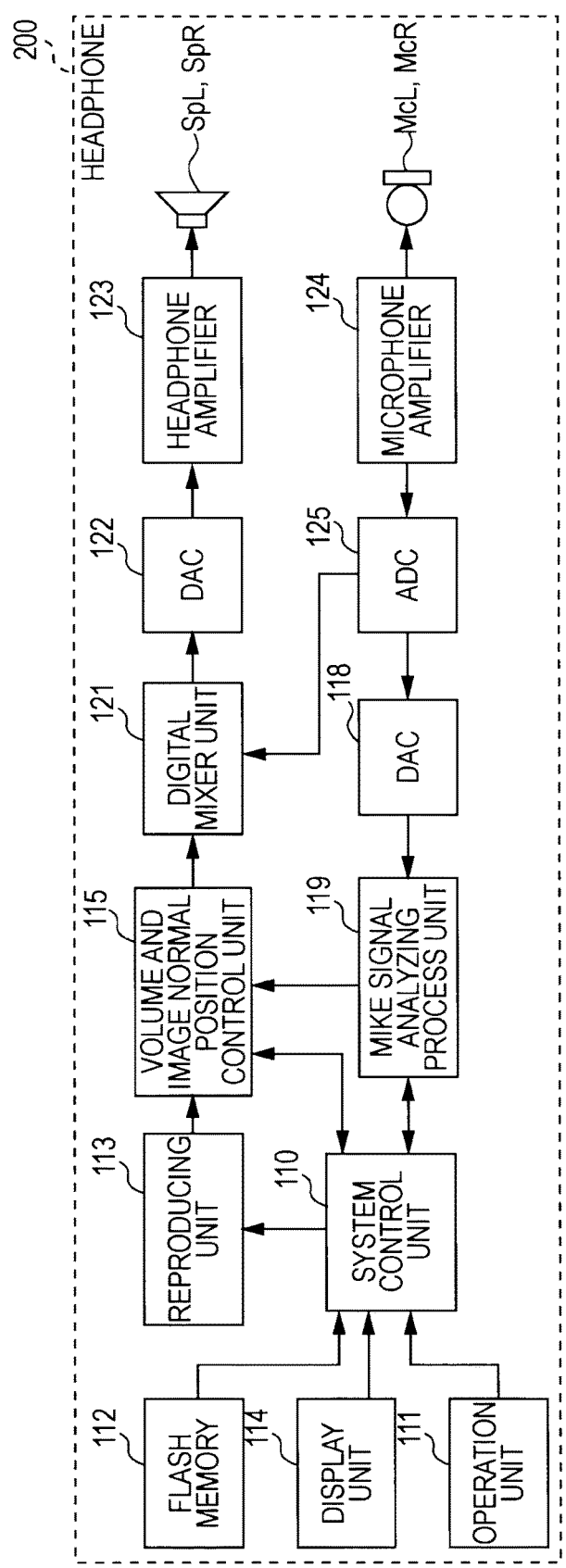
FIG. 7 is a diagram illustrating an example of an internal configuration of a player-integrated type headphone.

Likewise, as illustrated in FIG. 7, the embodiment of the present invention may be also applied to a player-integrated type headphone 200 into which the function of the DAP 102 is built. In the above mentioned case, the headphone 200 has an internal configuration formed by removing the RF reception unit 120 and the RF transmission unit 126 from the internal configuration of the headphone 101 and removing the RF transmission unit 116 and the RF reception unit 117 from the internal configuration of the DAP 102.

Likewise, the embodiment of the present invention may be further applied to a headphone system configured such that a headphone fitter may catch external sounds even when he fits a headphone on his head with no provision of the NC function. In the above mentioned case, for example, a microphone used to detect speaking of the headphone fitter may be included in the headphone so as to move the normal position of the image of a reproduced sound when speaking of the headphone fitter has been detected from a mike signal.

In the above mentioned case, as described above, a camera or a person sensor may be included in the headphone so as to move the normal position of the image of a reproduced sound when a person is detected in a predetermined range (for example, within a one-meter range) in the front of the headphone fitter.

In addition, the embodiment of the present invention may be still further applied to a talking system configured by a cellular phone as a substitution for the DAP 102 and a headset as a substitution for the headphone 101.

In the above mentioned talking system, the voice of a headset fitter which has been picked up using a microphone included in the headset is transmitted to the terminal of a talk mate via the cellular phone. The voice of the talk mate which is transmitted from the terminal of the call mate is received using the cellular phone and is output from a loudspeaker of the headset. The talking system is configured to implement talking in the above mentioned manner.

In the above mentioned case, as a matter of course, the position of the talk mate is apart from the headset fitter and hence it may be difficult to pick up the voice of the talk mate using a mike of the headset.

Thus, in external sounds which have been picked up using the mike of the headset, only a voice which comes from the vicinity of the front of the headset fitter, that is, only the voice of the headset fitter himself is emphasized by utilizing a technique for performing a beam-forming process.

Owing to the above mentioned operation, it is permitted to transmit the voice of the headset fitter to the terminal of the talk mate in more clear tone quality.

In addition, in the above mentioned embodiment, an example which is configured to include the digital mixer unit 121 in the headphone 101 has been described. As an alternative, the digital mixer unit 121 may be included in the DAP 102. Incidentally, the digital mixer unit 121 may be given as a specific example of the noise cancelling unit 8 and the beam-forming process unit 11 included in the reproducing device 1 which has been described with reference to FIG. 1.

2-8 Altered Embodiment 8

In the above mentioned embodiment, a specific example which is configured such that the reproducing unit 113, the volume and image normal position control unit 115, the RF transmission unit 116 and the mike signal analyzing process unit 119 are included in the DAP 102 serving as the reproducing device as the basic configuration has been described.

However, the present invention is not limited to the above mentioned configuration and the reproducing unit 113, the volume and image normal position control unit 115, the RF transmission unit 116 and the mike signal analyzing process unit 119 may be configured using other various hardware or software elements on condition that the above mentioned elements have the same functions as the above mentioned units.

In addition, the headphone 101 is the type which is fitted on the head of a user to output sounds from loudspeakers disposed in the vicinity of the ears of the user and hence the headphone 101 does not limit the type of the headphone used such as an inner-ear type, a canal type, a head-band type or the like.

2-9 Altered Embodiment 9

In the above mentioned embodiment, a specific example which is configured such that programs used to execute various processes are written in the memory (the ROM) which is built into the system control unit 110 has been described.

In addition to the above mentioned configuration, the programs may be written into a storage medium such as, for example, a memory card or the like such that the system control unit 110 reads each program out of the storage medium. In the above mentioned case, a slot into which the memory card is inserted is formed in the DAP 101.

Likewise, an external interface may be included in the DAP 102 such that each program is acquired from a computer which is connected with the external interface and is installed into the flash memory 112.

Likewise, a network interface may be included in the DAP 102 such that each program is downloaded from an external data source over a network using the network interface and is installed into the flash memory 112.

2-10 Modified Embodiment 10

The present invention is not limited to the above mentioned summary of the embodiment, specific examples thereof and other altered embodiments. That is, the present invention covers embodiments obtained by arbitrarily combining some of or all the above mentioned summary of the embodiment, specific examples thereof and other altered embodiments with one another and/or embodiments obtained by extracting some of them.

In addition, the above mentioned summary of the embodiment, specific examples thereof and other altered embodiments are mere examples and the present invention may be applied to other various embodiments without departing from the gist of the present invention.

For example, the above mentioned altered embodiments 3 and 4 may be combined with each other so as to detect that the headphone fitter has started talking with the person and has finished talking with the person by using various judging methods in combination.

The present application contains subject matter related to that disclosed in Japanese Priority Patent Application JP 2009-247927 filed in the Japan Patent Office on Oct. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A reproducing device comprising:
  circuitry configured to:
    reproduce a contents sound;
    output the contents sound which has been reproduced to a headphone;
    detect that a headphone fitter who wears the headphone talks with a person, by analyzing right and left sound signals captured by right and left microphones of the headphone;
    generate a control signal for moving a normal position of an image of the contents sound in response to a determination that the headphone fitter talks with the person; and
    move the normal position of the image of the reproduced contents sound to a position that is opposite a position of the person with respect to the headphone fitter and in response to the generated control signal,
    wherein the circuitry is configured to detect that the headphone fitter is talking to the person in an event a movement of the face of the headphone fitter is detected based on a displacement of the position of the person, the displacement being detected based on analyzing the right and left sound signals captured by the right and the left microphones of the headphone, and
    wherein the circuitry is configured to turn noise cancellation into an OFF state in response to the determination that the headphone fitter has started talking with the person.

2. The reproducing device according to claim 1, wherein the circuitry is configured to:
  detect that the headphone fitter has finished talking with the person,
  generate a control signal for moving the normal position of the image of the contents sound in response to a determination that the headphone fitter finished talking with the person, and
  move the normal position of the image of the reproduced contents sound to the normal position based on the control signal.

3. The reproducing device according to claim 2, wherein the circuitry is configured to analyze external sounds which have been picked up using the left and right microphones to determine that the headphone fitter is speaking and judge that the headphone fitter has started talking with the person in response thereto.

4. The reproducing device according to claim 3, wherein the circuitry is configured to judge, in an event the external sounds which have been picked up using the left and right microphones are analyzed and a state in which the headphone fitter does not speak to the person has lasted for a fixed time period, that the headphone fitter has finished talking with the person.

5. The reproducing device according to claim 4, wherein the circuitry is configured to:
  cancel noise by synthesizing a sound which is out of phase with the external sounds which have been picked up using the left and right microphones with the reproduced contents sound, and
  synthesize the external sounds which have been picked up using the left and right microphones with the reproduced contents sound.

6. The reproducing device according to claim 5, wherein the circuitry is configured to, in an event the circuitry synthesizes the external sounds which have been picked up using the right and left microphones with the reproduced contents sound, increase a volume of sounds in a predetermined frequency band in the external sounds which have been picked up using the right and left microphones.

7. The reproducing device according to claim 3, wherein the circuitry is configured to perform a beam-forming process of emphasizing a sound which comes from a specific position of the external sounds which have been picked up using the right and left microphones.

8. The reproducing device according to claim 3, wherein the circuitry is configured to judge, in an event the external sounds which have been picked up using the right and left microphones are analyzed and a predetermined word has been detected as a result of execution of analysis, that the headphone fitter has started talking with the person.

9. The reproducing device according to claim 2, wherein the headphone includes a camera that photographs a subject which is present in front of the headphone fitter, and
the circuitry is configured to judge, in case a person-detecting process of detecting the person from an image which has been taken using the camera is performed and the person has not been detected as a result of execution of the person-detecting process, that the headphone fitter has finished talking with the person.

10. The reproducing device according to claim 1, wherein the circuitry is configured to judge, in the event the movement of the face which has been detected has turned to a predetermined movement, that the headphone fitter has started talking with the person.

11. The reproducing device according to claim 1, wherein the headphone includes a bone-conduction microphone, and
the circuitry is configured to judge, in an event sounds which have been picked up using the bone-conduction microphone are analyzed and speaking of the headphone fitter has been detected, that the headphone fitter has started talking with the person.

12. The reproducing device according to claim 1, wherein the circuitry is configured to:
set a mode of the reproducing device to a talking mode in response to the determination that the headphone fitter is talking with the person, and
shift a mode of the reproducing device to a listening mode from the talking mode in an event the circuitry detects that the person has finished talking to the person.

13. The reproducing device according to claim 1, wherein in an event signal levels of the signals captured by the right and the left microphones are less than a predetermined threshold value, the circuitry is configured to detect the headphone fitter is not talking to the person.

14. A headphone comprising:
circuitry configured to:
reproduce a contents sound,
detect that a headphone fitter who wears the headphone talks with a person, by analyzing right and left sound signals captured by right and left microphones of the headphone,
generate a control signal for moving a normal position of an image of the contents sound in response to a determination that the headphone fitter talks with the person, and
move the normal position of the image of the reproduced contents sound to a position that is opposite a position of the person with respect to the headphone fitter and in response to the generated control signal; and
a loudspeaker configured to output the reproduced contents sound, wherein the circuitry detects that the headphone fitter is talking to the person in an event a movement of a face of the headphone fitter is detected based on a displacement of the position of the person, the displacement being detected based on analyzing the right and left sound signals captured by the right and left microphones of the headphone,
wherein the circuitry is configured to turn noise cancellation into an OFF state in response to the determination that the headphone fitter has started talking with the person.

15. A reproducing method comprising:
detecting that a headphone fitter who wears a headphone talks with a person by analyzing right and left sound signals captured by right and left microphones of the headphone;
generating a control signal for moving a normal position of an image of a contents sound in response to a determination that the headphone fitter talks with the person;
moving a normal position of an image of a reproduced contents sound to a position that is opposite a position of the person with respect to the headphone fitter and in response to the generated control signal; and
outputting the contents sound to the headphone,
wherein the headphone fitter is detected as talking to the person in an event a movement of a face of the headphone fitter is detected based on a displacement of the position of the person, the displacement being detected based on analyzing the right and left sound signals captured by the right and the left microphones of the headphone,
wherein a noise cancellation function is turned into an OFF state in response to the determination that the headphone fitter has started talking with the person.

* * * * *